Sept. 1, 1936.    N. A. PALMGREN    2,053,202
UNIVERSAL PLAIN BEARING
Filed Jan. 19, 1935

Inventor
Nils Arvid Palmgren
By Chas Lyon Russell
his Attorney

Patented Sept. 1, 1936

2,053,202

UNITED STATES PATENT OFFICE 2,053,202

UNIVERSAL PLAIN BEARING

Nils Arvid Palmgren, Goteborg, Sweden, assignor to Aktiebolaget Svenska Kullagerfabriken, Goteborg, Sweden, a corporation of Sweden Application January 19, 1935, Serial No. 2,597
In Sweden May 9, 1934

2 Claims. (Cl. 308—122)

In plain bearings of the kind in which the lubricant is introduced through holes in a side disc disposed at the outer non-rotating bearing ring it is of importance that the side disc should be prevented from taking part in the rotation of the inner bearing ring. In self-aligning, or universal bearings, in which the rotating ring bears axially against side discs which are supported by the spherical sliding surface of the non-rotating ring, the risk that the side discs will rotate is considerable, especially when thick oil is used as lubricant. As it is not possible to combine self-alignment with positive fixation of the side discs, provision must be made with this type of bearing to provide at all times sufficient frictional braking forces acting between the side disc and the non-rotating bearing ring, whether or not the side discs are subjected to thrust. This problem has been solved through the present invention by causing the side discs to press yieldingly against the spherical sliding surface of the outer ring, for instance by making the side discs slightly curved in axial direction so that they bear against the sliding surface of the inner ring at one side and against the spherical surface of the outer bearing ring at the other side by their own elasticity. The extent of the curvature should then be greater than the axial play of the bearing.

Figure 1:
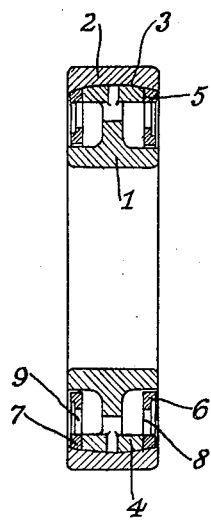
Figure 2:
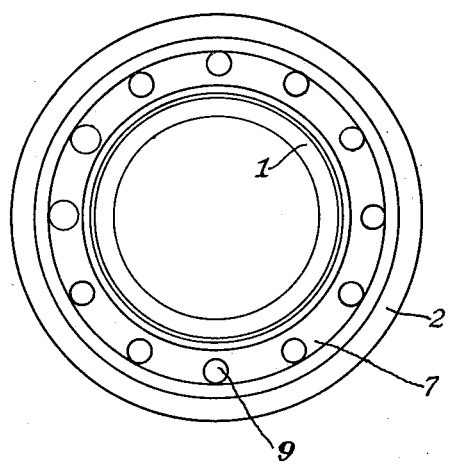
Figure 3:
Figure 4:

The invention is illustrated in the accompanying drawing in which Figure 1 is a section in an axial plane of a bearing according to one embodiment of the invention, and Figure 2 is a side view of the same bearing. Figure 3 shows a side disc for the bearing, according to Figures 1 and 2, in its originally plane form seen from the edge, and Figure 4 shows the same disc after having been flexed in axial direction.

The inner ring 1 is of I-section and bears radially against the spherical sliding surface 3 of the outer ring 2. The outer flange 4 of the inner ring has plane sliding surfaces 5 on the edges, said surfaces bearing axially against the side discs 6, 7. The lubricant is introduced into the bearing through holes 8, 9 in the side discs.

When the inner ring presses against one of the side discs the latter is wedged against the sphere of the outer ring and is then held still owing to the fact that the force acting upon an element of the ring 6 from the spherical surface of the outer ring 2 and directed toward the center of the sphere is greater than the force acting on an element of the ring 6 from the flange of the inner ring which is directed perpendicularly to the plane of the contacting surface between these rings. The resultant of these two forces is directed perpendicularly to the axis of the bearing since the ring being in equilibrium it must be balanced by a similar force acting on a diametrically opposite element of the ring 6. Assume a force which will be called T, acting on an element of the ring 6 from the flange of the inner ring. This force is directed perpendicularly to the plane of the contacting surfaces between these rings. To balance this force, there must be a reaction force which will be called P acting upon the ring 6 from the spherical surface of the outer ring 2 of the bearing. Since the ring 6 is in equilibrium, it follows that the axial components of the forces T and P must be equal. The resultant of these two forces, R, is directed perpendicularly to the axis of the bearing, since it must be balanced by a similar force acting on a diametrically opposite element of the ring 6. According to the laws of mechanics the force P is directed toward the center of the sphere and the relative magnitude of the forces P, T and R can be obtained from a simple parallelogram of forces, from which it will be apparent that the force P is greater than the force T and since other things being equal the coefficient of friction between the inner ring of the bearing and the ring 6 and between the ring 6 and the outer ring of the bearing would be the same, it follows that the fully developed frictional force between the ring 6 and the spherical surface of the outer ring 2 acting on the element shown will be greater than the fully developed frictional force between the inner ring 6 and the inner ring of the bearing. It follows that the friction between the inner ring and the ring 6 at the plane surfaces of contact is insufficient to rotate the ring 6 in the spherical surface of the outer ring, and the ring 6 will therefore remain stationary. The other side disc, however, will at the same time be free and is then carried along in the rotation by the oil which rotates with the inner ring. The oil is thereby prevented from access through the holes 8 or 9 with consequent risk for the bearing running dry. If both discs are free and begin to rotate, the bearing will immediately run dry.

The discs 6, 7, however, cannot be positively secured to the outer ring, partly because the bearing would then lose its self-aligning capacity and partly because it has to be assembled with the inner and outer ring in perpendicular planes relative to each other. However, if the discs are arranged to always press against the spherical surface of the outer ring with a certain axial force, the desired friction is obtained by the wedging action of the disc against the sphere. According to the present invention this axial force may be obtained by first working the side disc into the shape of a body of revolution in the usual manner, for instance by turning, whereupon it is slightly flexed in an axial direction. Figure 3 shows the plane disc after the first operation. Figure 4 shows the disc, seen from the edge, and after having been flexed so that its originally plane surface will form part of a cylindrical surface or other curved surface. The figure shows this deformation considerably exaggerated, in order to be fully perceptible. It should in reality not greatly exceed the total axial play of the bearing. When the bearing is loaded axially the discs are flattened under elastic tension so that they bear in ordinary manner against the flange of the inner as well as against the outer ring. The manner of deforming the disc, as shown in Figure 4, results in a disc having two crests and two troughs, but it is apparent that the disc can be otherwise deformed to give any desired number of waves. It has however been found in practice that two waves are sufficient to obtain the effect desired.

For an understanding of the expression "Two crests and two troughs" the following explanation may prove helpful: The easiest way of manufacturing the side discs is to make them with plane surfaces. Discs of this kind are, however, prone to rotate in the bearing and, in order to prevent them from rotating, it has been found desirable to provide means for pressing the discs against the spherical surface of the outer ring, whereby the friction between the side discs and the outer ring will prevent the former from rotating. One way of causing the side disc to be pressed against the spherical surface of the outer ring is to permanently deform the disc so that the originally flat surface will become cylindrical. This is illustrated in Figure 4 in the drawing. In other words, the discs are deformed in such a manner that if placed upon a plane surface they will rock. The discs will be farthest from the plane surface at two opposite points and closest to the plane surface at two points intermediate thereof. On following the surface of a ring around the circumference, there will be two high spots and two low spots. The high spots are the crests and the low spots are the troughs.

Having thus described my invention, I claim and desire to secure by Letters Patent:

1. A universal plain bearing comprising an inner bearing ring formed with an outer spherical sliding surface, an outer bearing ring formed with an inner spherical sliding surface fitting the sliding surface of the inner bearing ring, and side discs carried and axially supported by the outer ring and provided with substantially plane sliding surfaces bearing against the inner bearing ring, the side discs being waved for elastically pressing against the spherical surface of the outer ring.

2. A universal plain bearing according to claim 1, characterized thereby that the side discs are formed of elastic material and are slightly sinuous in an axial direction and bear against the sliding surface of the inner ring at one side and against the spherical surface of the outer ring at the other side by virtue of their own elasticity.

NILS ARVID PALMGREN.